United States Patent
Abraham et al.

(10) Patent No.: US 6,544,127 B1
(45) Date of Patent: Apr. 8, 2003

(54) TOOL FOR REPAIRING DAMAGED THREADS

(75) Inventors: Moshe Abraham, Mobile Post Ephraim (IL); Zeev Stahl, Jerusalem (IL)

(73) Assignee: Shilo Technologies Ltd., Jerusalem (IL)

( * ) Notice: Subject to any disclaimer, the term of this patent is extended or adjusted under 35 U.S.C. 154(b) by 0 days.

(21) Appl. No.: 09/694,525

(22) Filed: Jan. 2, 2001

(30) Foreign Application Priority Data

Oct. 27, 1999 (IL) .................................................. 132602

(51) Int. Cl.⁷ ................................................ B21J 13/02
(52) U.S. Cl. .......................... 470/198; 470/96; 470/200
(58) Field of Search ........................... 470/96, 198, 199, 470/200, 204

(56) References Cited

U.S. PATENT DOCUMENTS

| | | | |
|---|---|---|---|
| 1,429,850 A | | 9/1922 | Dowd |
| 1,600,927 A | * | 9/1926 | Bryant ........................ 470/200 |
| 1,614,197 A | * | 1/1927 | Hyrup ........................ 470/200 |
| 3,966,348 A | * | 6/1976 | Burgsmuller ................ 470/96 |
| 4,121,486 A | * | 10/1978 | Frank ........................... 82/113 |
| 5,281,059 A | | 1/1994 | Stuckle |
| 5,573,357 A | * | 11/1996 | Mirles ........................ 470/96 |
| 5,924,325 A | * | 7/1999 | Brucher et al. ............... 74/106 |

FOREIGN PATENT DOCUMENTS

| | | | |
|---|---|---|---|
| GB | 563102 | 7/1944 | |
| SU | 1678558 | * 9/1991 | ................ 470/199 |

* cited by examiner

*Primary Examiner*—Ed Tolan
(74) *Attorney, Agent, or Firm*—Charles T. Weigell, Esq.; Bryan Cave LLP

(57) ABSTRACT

The invention provides a chasing tool for repairing damaged internal threads, including a body provided with a bore; a handle retained in the bore with one degree of freedom in rotation, the handle being provided over at least part of its length with an internal thread; a cylindrical component having an external thread matching the internal thread of the handle; a tubular member fixedly attached to the body perpendicular to the axis of rotation of the handle and opening into the bore of the body and a lever tiltable about a pivot providing the lever with one degree of freedom in rotation, the cylindrical component being articulated to the lever and a cutter articulated to the other end of the lever, the cutter projecting from the tubular member. In another embodiment, there is provided a chasing tool for repairing damaged internal threads, including a bar; a first arm fixedly attachable to the bar and extending perpendicular to the bar; a second arm, co-planar with the first arm and slidable along the bar; means for immobilizing the second arm along the bar, and at least one cutter articulated to the second arm.

8 Claims, 8 Drawing Sheets

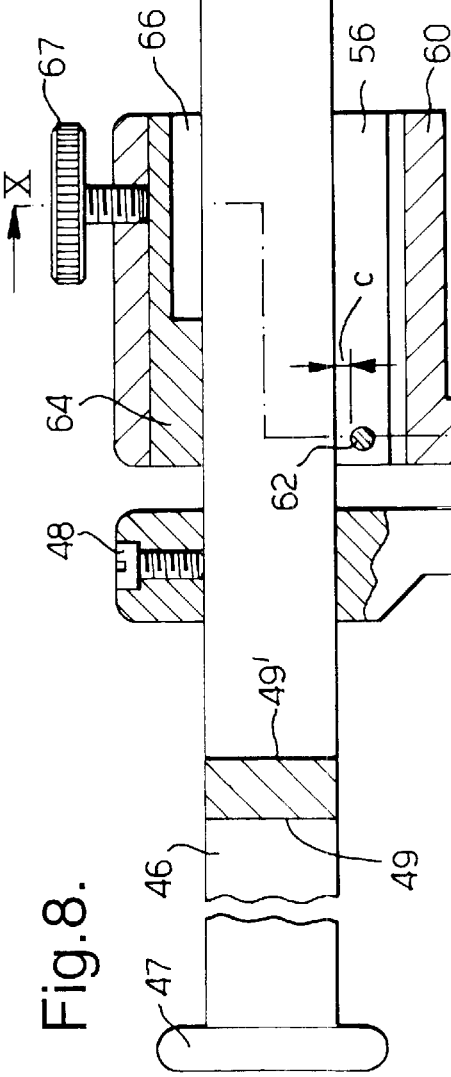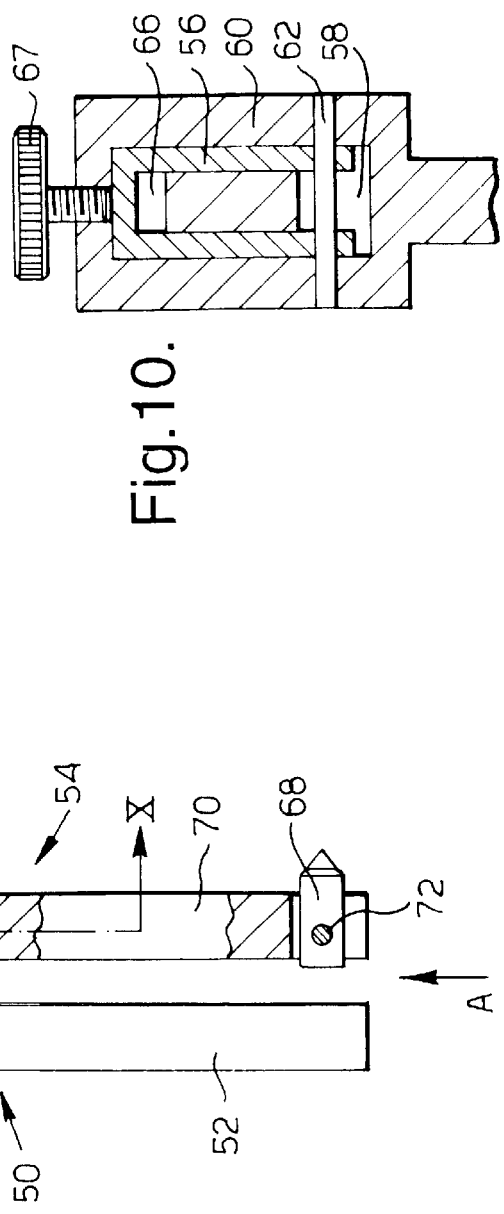

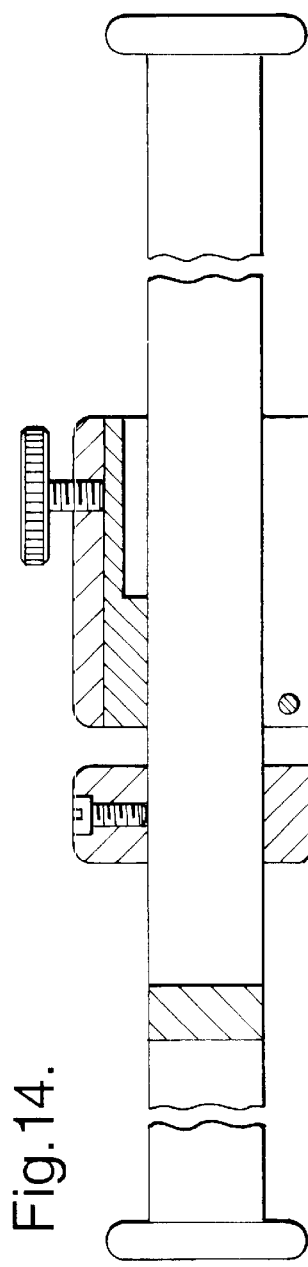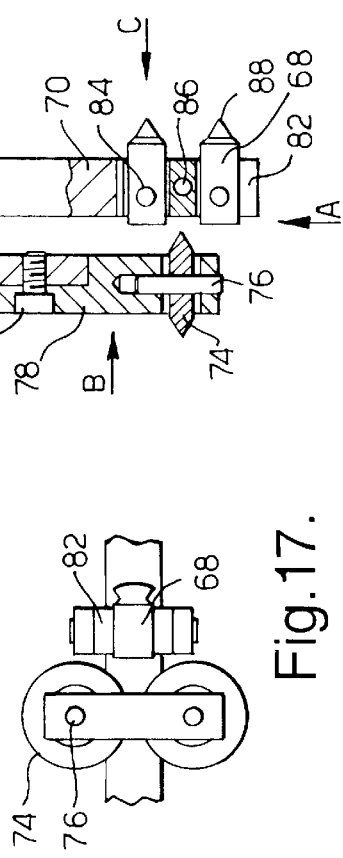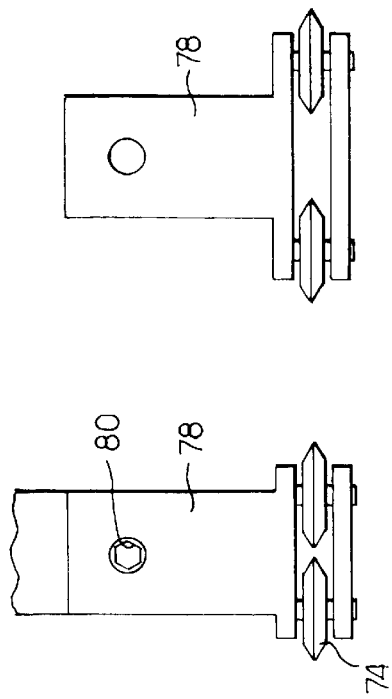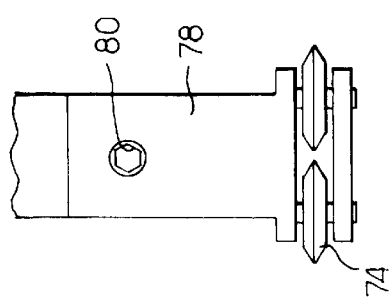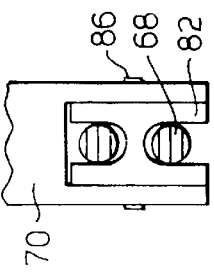

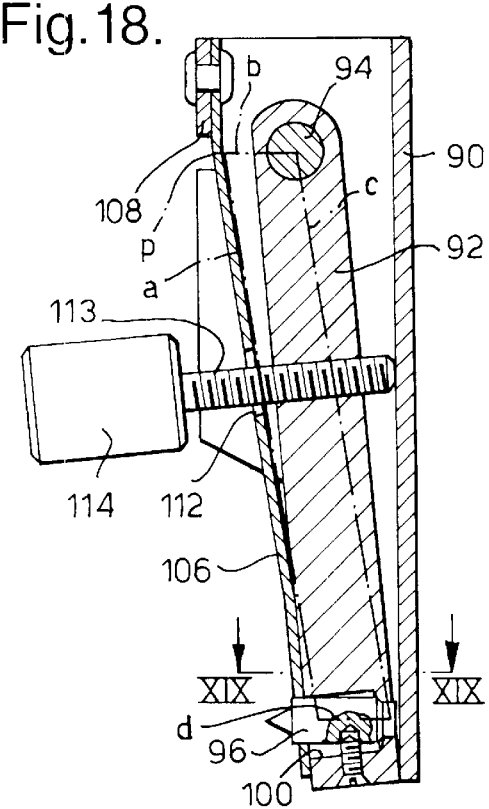
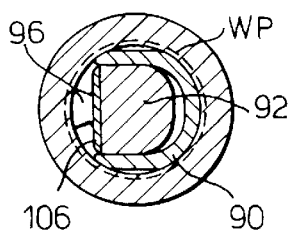
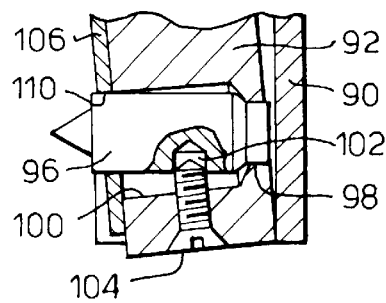
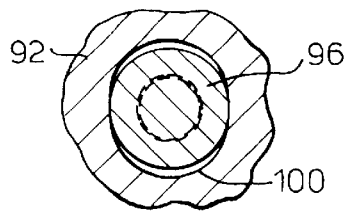
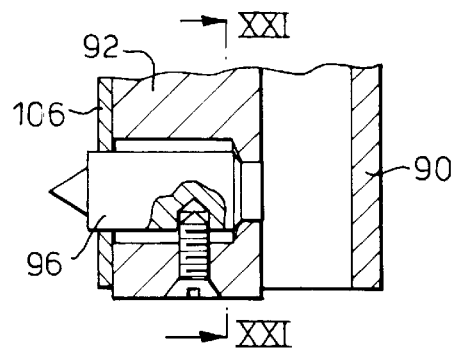
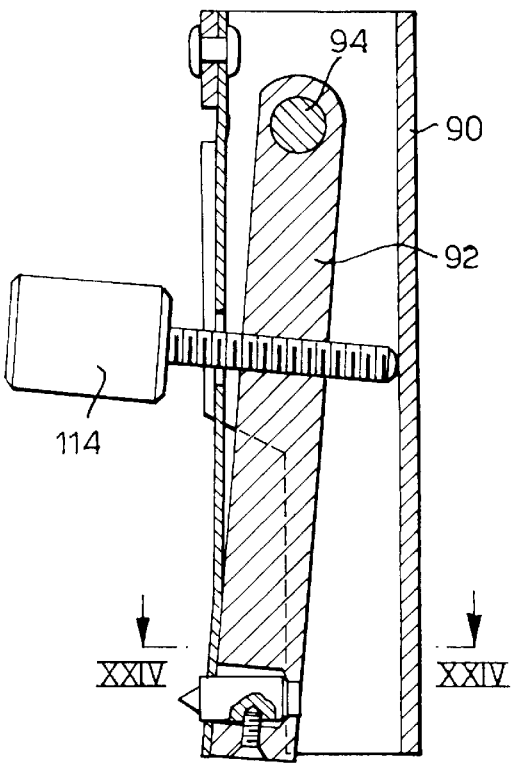

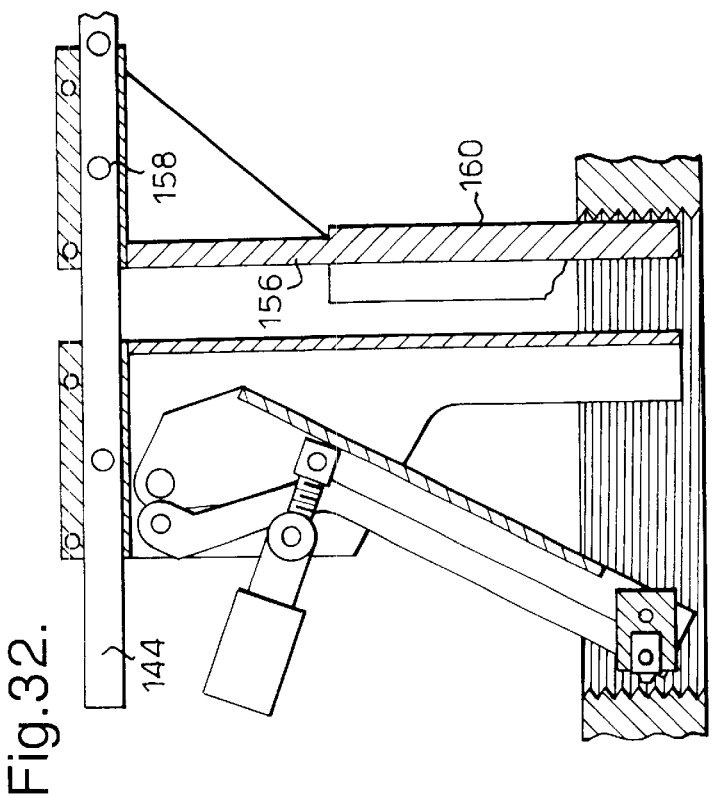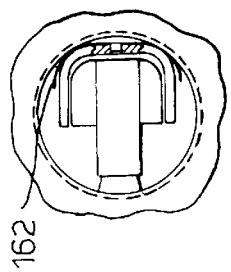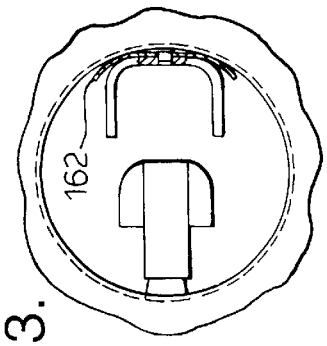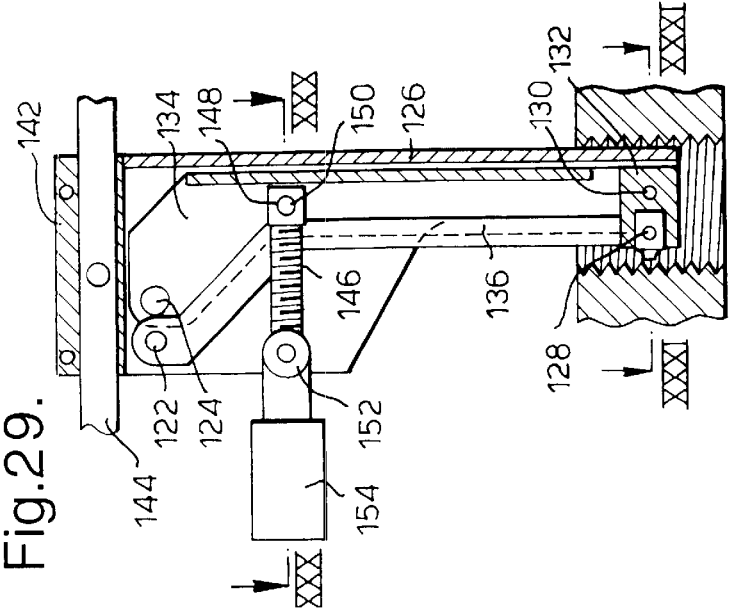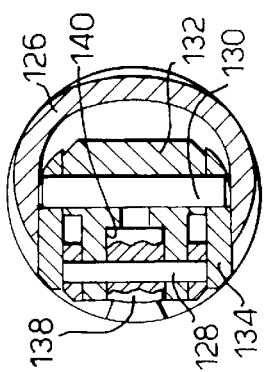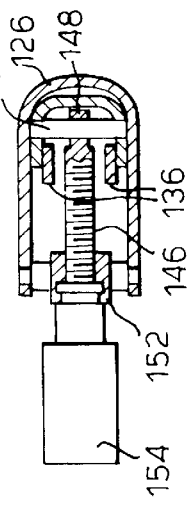

TOOL FOR REPAIRING DAMAGED THREADS

FIELD OF THE INVENTION

The present invention relates to a chasing tool for repairing damaged internal threads.

BACKGROUND OF THE INVENTION

Internal threads, although better protected against mechanical damage than external threads, are frequently damaged by jamming, due to forcible introduction of male components which either have a different pitch, or were misaligned. Also, there often arises the need to remove scale, rust or other encrustations.

SUMMARY OF THE INVENTION

It is thus one of the objects of the present invention to provide a chasing tool for repairing internal threads that is effective, inexpensive and easily operated.

According to the invention, the above object is achieved by providing a chasing tool for repairing damaged internal threads, comprising a body provided with a bore; a handle rotatably fitting a portion of said bore and retained therein with one degree of freedom in rotation, said handle being provided over at least part of its length with an internal thread; a substantially cylindrical component, provided with an external thread matching the internal thread of said handle over at least part of its length; a tubular member fixedly attached to said body in a direction substantially perpendicular to the axis of rotation of said handle and opening into the bore of said body; a lever tiltable about a pivot fixedly mounted in said tubular member and providing said lever with one degree of freedom in rotation, said threaded cylindrical component being articulated to one end of the lever and a cutter being articulated to the other end of the lever, said cutter projecting from the tubular member through a window-like opening therein; the arrangement being such that when the handle is rotated in one sense, said cutter is caused to project more from the tubular member, and when the handle is rotated in the other sense, said cutter is caused to project less from the tubular member.

The invention further provides a chasing tool for repairing damaged internal threads, comprising a bar having at least two substantially flat, opposite surfaces; a first arm fixedly attachable to said bar and extending in a direction substantially perpendicular to said bar; a second arm, substantially co-planar with said first arm and slidable along the bar while being guided by said two flat, opposite surfaces of the bar; means for immobilizing said second arm at an optional location along said bar, and at least one cutter articulated to the free end of said second arm.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a cross-sectional view of a first embodiment of the invention;

FIG. 2 is a partial cross-sectional view of the lever as seen in the direction of arrow A in FIG. 1;

FIG. 3 is a view of the tool as seen in the direction of arrow B in FIG. 1;

FIG. 4 is a perspective view of the tool according to the invention;

FIG. 5 is a top view of the cutter;

FIG. 6 is a side view of the cutter;

FIG. 7 is a perspective view of the cutter;

FIG. 8 is an elevational view, in partial cross-section, of another embodiment of the tool according to the invention;

FIG. 9 is a view of the tool, as seen in the direction of arrow A in FIG. 8;

FIG. 10 is a view in cross-section along plane X—X in FIG. 8;

FIGS. 11, 12 and 13 illustrate different steps preparatory to the use of the tool;

Figure 24:
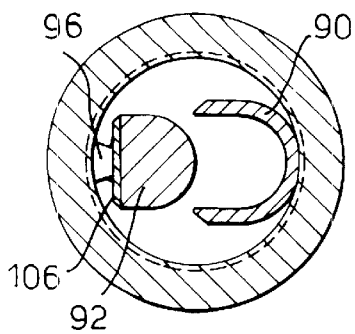
Figure 25:
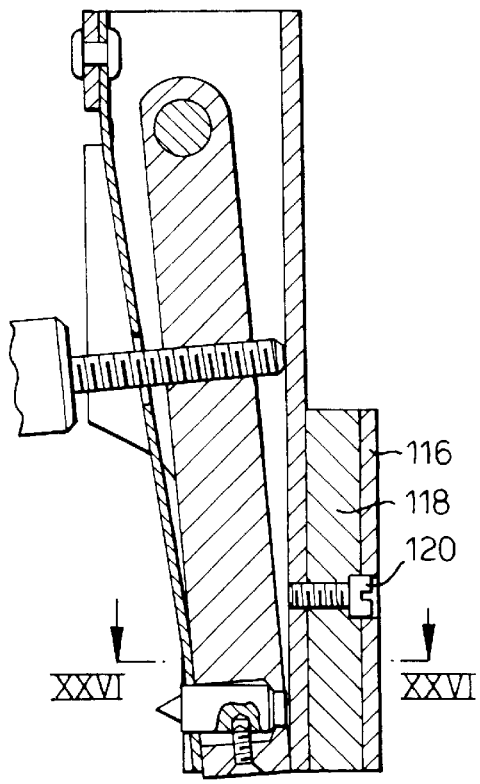
Figure 27:
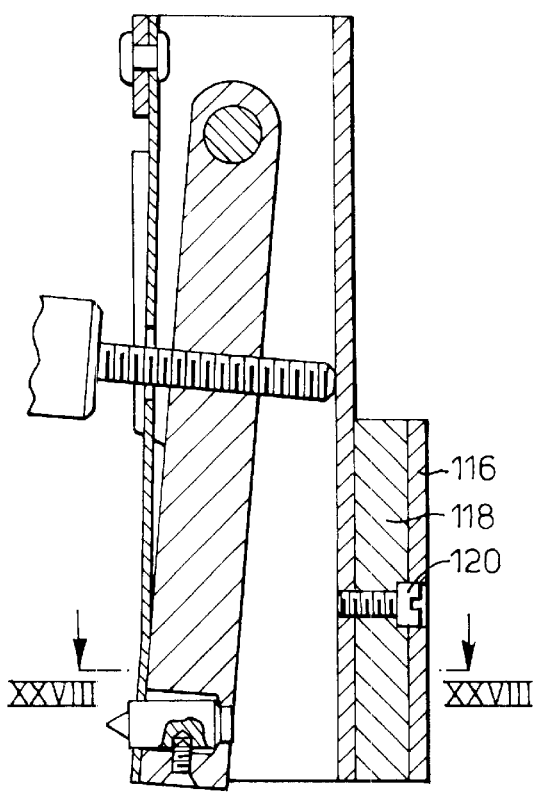
Figure 26:
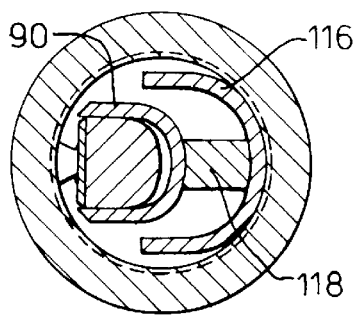
Figure 28:
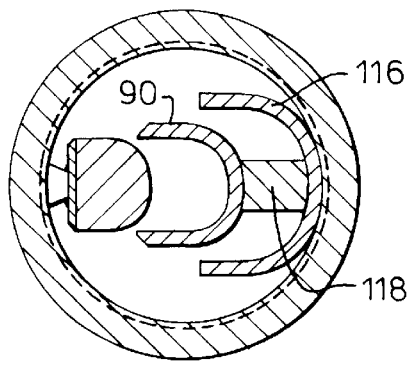

FIG. 14 is an elevational view, in partial cross-section, of a variant of the embodiment of FIG. 8;

FIG. 15 is a view of the tool, as seen in the direction of arrow A in FIG. 14;

FIG. 16 is a view of the roller holder, as seen in the direction of arrow B in FIG. 14;

FIG. 16A shows another roller holder with a larger center distance of the pair of rollers;

FIG. 17 is a view of the cutter holder, as seen in the direction of arrow C in FIG. 14;

FIG. 18 represents another embodiment of the chasing tool according to the invention;

FIG. 19 is a view in cross-section along plane XIX—XIX of the tool of FIG. 18;

FIG. 20 is an enlarged, cross-sectional view of the lower portion of the tool shown in FIG. 18;

FIG. 21 is a view in cross-section along plane XXI—XXI of the enlarged tool portion of FIG. 20;

FIG. 22 shows the lower portion of the tool of FIG. 18 at the middle of its range;

FIG. 23 represents the tool of FIG. 18 at the upper end of its range;

FIG. 24 is a view in cross-section along plane XXIV—XXIV of the tool as represented in FIG. 23;

FIG. 25 is a cross-sectional view of the tool of FIG. 18, including the attachment for increasing the upper limit of the tool's reach;

FIG. 26 is a view in cross-section along plane XXVI—XXVI of the tool of FIG. 25;

FIG. 27 shows the tool of FIG. 25 at the upper limit of its reach;

FIG. 28 is a view in cross-section along plane XXVIII—XXVIII of the tool of FIG. 27;

FIG. 29 represents yet another embodiment of the chasing tool according to the invention;

FIG. 30 is a view in cross-section along plane XXX—XXX of the tool of FIG. 29;

FIG. 31 is a view in cross-section along plane XXXI—XXXI of the tool of FIG. 29;

FIG. 32 shows the tool of FIG. 29 in an extended position and includes an attachment for extending the upper limit of the tool's reach, and FIGS. 33 and 34 illustrate a pressure pad for use in the tools of FIGS. 30 or 19, at the lower and upper ends of the ranges, respectively.

DETAILED DESCRIPTION OF PREFERRED EMBODIMENTS

Figure 1:
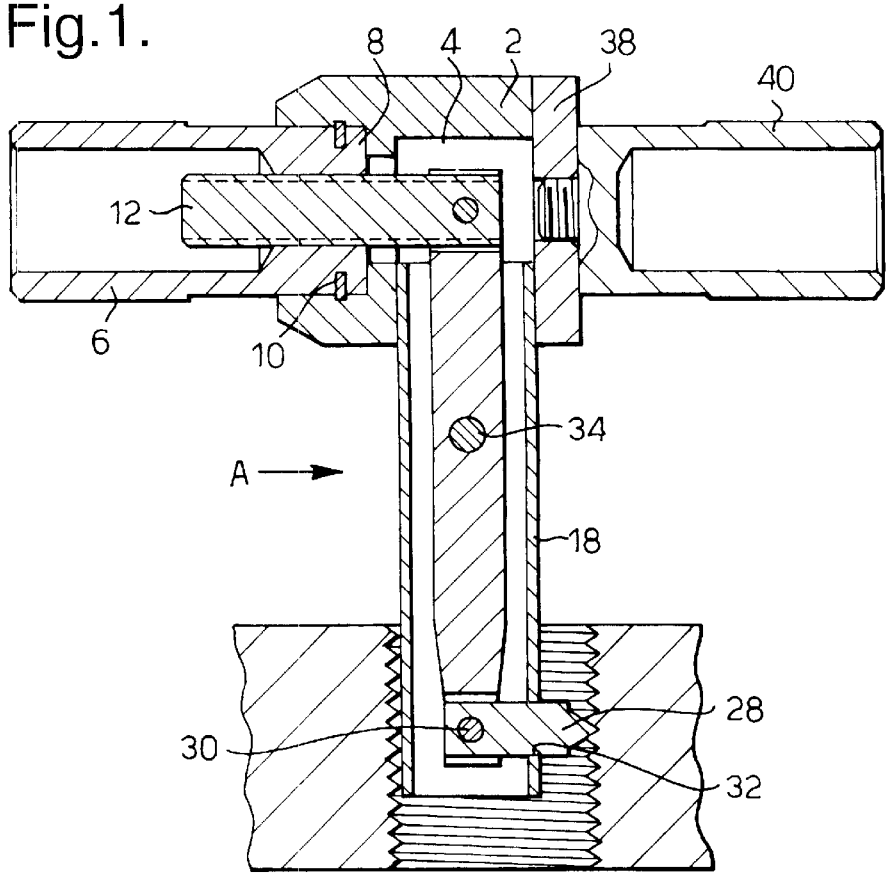

Referring now to the drawings, FIG. 1 is a cross-sectional view of a first embodiment of the tool according to the invention. Shown is a body 2, advantageously cylindrical, provided with a stepped bore 4. Into the wider end of bore 4 fits a handle 6, seated against a shoulder 8 and retained within bore 4 by a retaining ring 10. Handle 6, advantageously knurled, has one degree of freedom in rotation relative to body 2. The body-side end of handle 6 is provided with an internal thread which matches with the external thread of a threaded rod 12, which is articulated by means of a pin 14 to a lever 16 (see also FIG. 2) located inside and extending along a tubular member 18 fixedly attached to body 2. Tubular member 18, as seen in FIG. 3, is advantageously provided with rounded corners.

Figure 2:
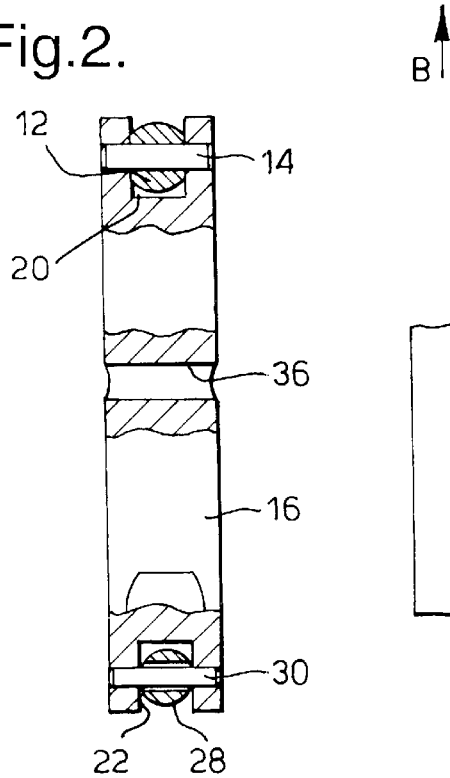
Figure 3:
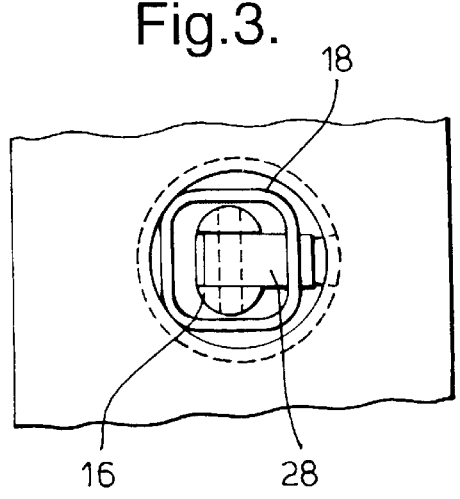

FIG. 2 illustrates lever 16 from the direction of arrow A in FIG. 1. Lever 16 is provided at its upper end with a slot 20 into which fits the end of rod 12. Also seen is pin 14, whereby rod 12 is articulated to lever 16. Slot 20 is deep enough to permit rod 12 a tilt of some degrees about pin 14.

Another slot 22, seen at the lower end of lever 16, accommodates a cutter 28, to be described in detail further below, which is articulated to lever 16 by means of a pin 30. Cutter 28 protrudes from tubular member 18 through an opening 32.

Lever 16 is adapted to tilt about a fulcrum in the shape of a pin 34 which passes through a hole 36 and is anchored in two opposite walls of tubular member 16 (see FIG. 4), providing lever 16 with one degree of freedom in rotation. The lower end of lever 16 is somewhat narrowed down, to increase the angle of possible tilt.

The cross-sectional shape of lever 16 is clearly discernible in FIG. 3, a view from the direction of arrow B in FIG. 1. The shape is an oval, with the major axis of the oval being a sliding fit with respect to two opposite, inside walls of tubular member 18.

Figure 4:
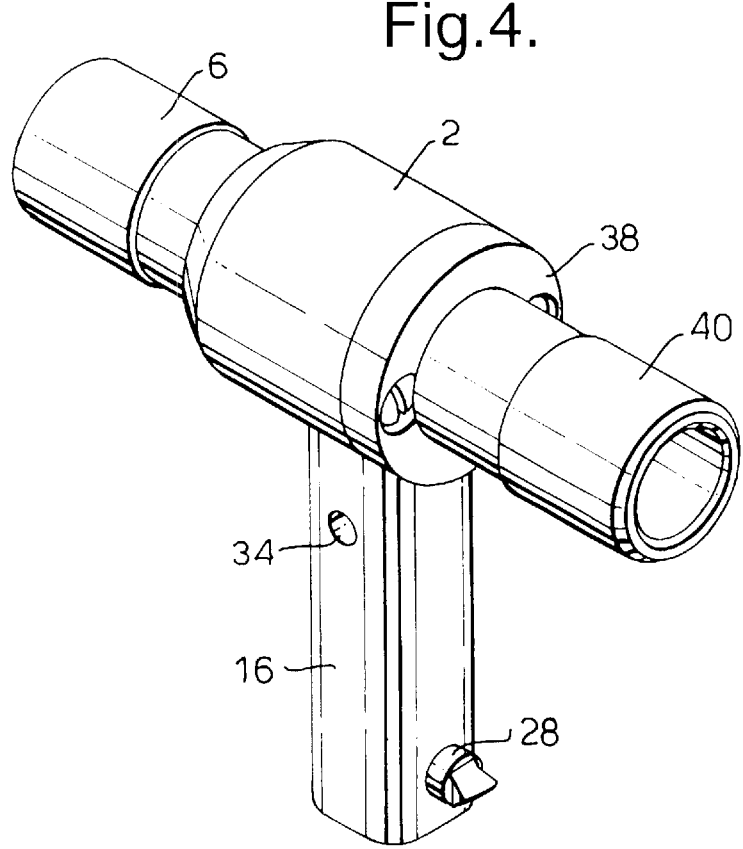

Further seen in FIGS. 1 and 4 is a cover plate 38 closing bore 4 of body 2, and a second handle 40 which permits the application of a pure torque during operation of the tool.

Figure 5:
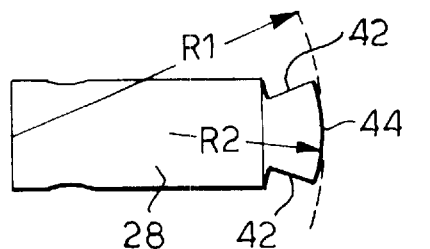
Figure 6:
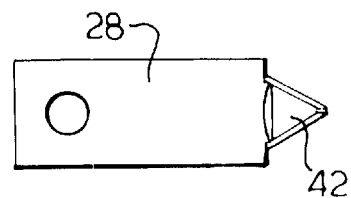
Figure 7:
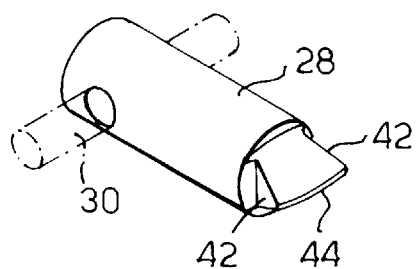

FIGS. 5 to 7 illustrate cutter 28. In the top view of FIG. 5, cutter 28 is seen to have two cutting faces 42, which means that cutter 28 will operate whether the device is rotated in the clockwise, or in the counter-clockwise, sense. This facilitates not only the repair of left-handed threads, but also of right-handed threads, in which, as is often the case, the damage affects the first few turns of the thread, which are very hard to repair except from the inside of a threaded bore towards the outside.

Further seen in FIG. 5 are two radii $R_1$ and $R_2$, where $R_1$ denotes the radius of the smallest thread diameter for which the tool can be used, and $R_2$ denotes the radius of edge 44. As is seen, $R_1 > R_2$, which means that cutter 28 can, in no case, "dig in," as the point of cutter 28 will never reach the root of the thread. Since damage to threads is almost exclusively found at or near the tooth crest rather than at the root, this feature does not affect the damage-repairing efficiency of the tool, while it does prevent jamming due to "digging in."

While the use of the term "radius $R_2$" in conjunction with cutter edge 44 appears to indicate that edge 44 was conceived to be part of a circle, it may, in fact, be part of any curve that will meet the above-defined conditions.

FIG. 7 also indicates pin 30, about which cutter 28 can pivot with the clearance required to permit cutter 28 to adapt itself to the lead angle of the internal thread.

The kinematics of this embodiment are quite simple. As threaded rod 12, being articulated to lever 16, cannot rotate, and handle 6, being retained by ring 10, cannot move in translation, the rotation of handle 6 will cause rod 12 to move in a straight line. Assuming the thread of rod 12 to be a right-handed one, rotation of handle 6 in the clockwise sense will cause rod 12 to move to the left, causing lever 16, to which rod 12 is articulated, to tilt about pin 34 in the counter-clockwise sense, thereby pushing cutter 28 towards the outside of tubular member 18. Conversely, rotation of handle 6 in the counter-clockwise sense will reverse the direction of the kinematic chain and cause cutter 28 to withdraw towards tubular member 6.

In operation, by rotating handle 6 in the counter-clockwise direction, cutter 12 is sufficiently withdrawn to permit the repair tool to be introduced into the threaded component, as shown in FIG. 1. Handle 6 is then rotated in the clockwise sense until cutter edge 44 enters between two thread flanks, while tubular member 16 is forced with two of its rounded corners against the threads opposite cutter 28, as clearly shown in FIG. 3. After these preparatory steps, the tool is gripped by its two handles 6 and 40 and is rotated in whatever direction is indicated by the location and extent of the damaged section or sections.

A further embodiment of the invention is seen in FIGS. 8 to 12. There is seen in FIG. 8 a bar or handle 46, having a rectangular cross-section, provided for convenience with gripping discs 47. Fixedly attached to handle 46 by a screw 48 is a first arm 50, the lower part 52 of which is intended to be in contact with the internal thread to be repaired. Part 52 has a substantially rectangular cross-section, two corners of which have been rounded off, as shown in FIG. 9. FIG. 9 also shows that lower part 52 of first arm 50 touches the internal thread along two lines a, b only.

Further seen is a second arm 54, slidable along handle 46 and guided by the two broad surfaces 49. 49' of handle 46 by means of an inverted-U-shaped insert 56, seen in cross-section in FIG. 10, that snugly fits a rectangular passage 58 in the upper part 60 (FIG. 10) of arm 54. Insert 56 is articulated to upper part 60 by means of a pin 62 about which it can tilt to some degree, as its web 64 is provided with a recess 66 and its height is less than the height of passage 58. This tiltability, as well as the initial clearance c between pin 62 and the lower surface of handle 46 (FIG. 8), is of importance to the function of second arm 54, as will be explained in conjunction with FIGS. 11, 12 and 13. Also seen is a thumbscrew 67.

A cutter 68, of the type discussed above in conjunction with the previous embodiment, is articulated to the end of lower part 70 of second arm 54. Here, too, sufficient clearance between a pin 72 and a hole in cutter 68 permits the latter to adapt itself to the lead angle of the internal thread.

Figure 11:
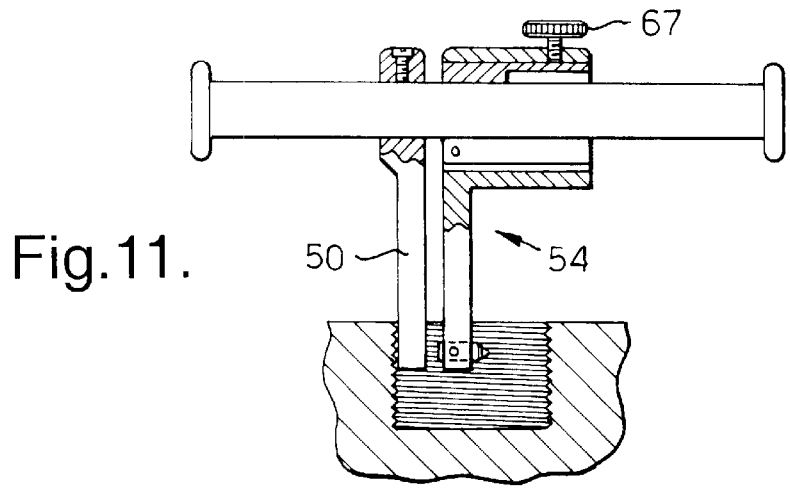
Figure 12:
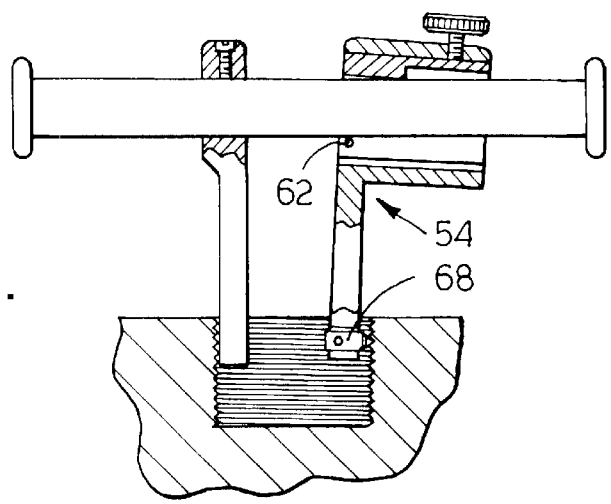
Figure 13:
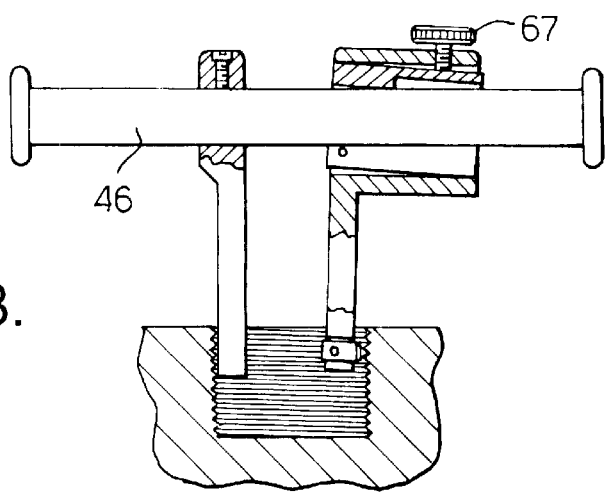

The steps in preparation for use of the tool are illustrated in FIGS. 11 to 13. With thumbscrew 67 raised (FIG. 11), arm 54 is slid close enough towards arm 50 so that the tool can be introduced into the threaded bore. Once inside the bore (FIG. 12), arm 54 is drawn to the right, beyond the point where cutter 68 has made contact with the thread, until arm 54 is slightly skewed, as seen with some exaggeration in FIG. 12. Then (FIG. 13), thumbscrew 67 is screwed down, thereby turning arm 54 into a bellcrank lever having its fulcrum at pin 62, arm 54 thus providing the pressure required to keep cutter 68 inside the thread during the cutting action, which commences when the tool is turned with the aid of handle 46.

An elaboration of the previous embodiment is illustrated in FIGS. 14–17. In this variant, as seen in FIGS. 14, 15, arm 50 is provided with a pair of rollers 74 rotatable about pivots 76 and mounted in a holder 78 affixed to arm 50 by means of screw 80. Rollers 74 possess a profile that matches the thread and have a certain amount of play along pivots 76 which permits them to adjust their relative positions, taking into account the lead angle of the thread and the use of two cutters 68. Rollers 74 greatly reduce the friction encountered by arm 52 of the embodiment of FIG. 8.

FIG. 16 shows holder 78 and rollers 74, as seen from the direction of arrow B of FIG. 14. For internal threads of larger diameters, it is advantageous to use a roller holder with a larger center distance of rollers 74, such as shown in FIG. 16A. This increases the stability of the tool during use.

The above-discussed "floating" feature of rollers 74 also facilitates the use of two cutters 68, as shown in FIGS. 14 and 17. Cutters 68, in shape identical to cutters 28 of the embodiment of FIG. 1, are freely articulated to a cutter holder 82 by means of pins 84. Cutter holder 82, in its turn, is articulated to the lower part 70 of second arm 54 by means of a pin 86. This rocking feature equalizes the pressure exerted on each of cutters 68, while the free pivoting of cutters 68 about pins 84 ensures that the distance between the edges 88 is always a multiple of the thread pitch. Use of this embodiment is analogous to the use of the embodiment of FIG. 8.

In design and function, the upper part of second arm 54 of FIG. 14 is identical with that of FIG. 8. It will be appreciated that the embodiment of FIG. 14 can also be used with one cutter only, with rollers 94, but with a cutter arrangement similar to that of FIG. 8.

FIG. 18 represents another embodiment of the chasing tool according to the invention. It comprises a housing 90 of a substantially U-shaped cross-section, which is seen to better advantage in FIG. 19, in which WP stands for workpiece. Inside this housing there is located a lever or beam 92, the upper end of which is articulated to housing 90 by means of a rod 94, which projects from both sides of housing 90 and serves also as a handle whereby to rotate the tool.

At the lower end of beam 92 there is seen in the enlarged drawing of FIG. 20 a cylindrical cutter 96, one end of which is constituted by the cutting edges known from the previous embodiments and, the other end of which is stepped down to a smaller diameter seated with some clearance in a hole 98 in beam 92, seen to best effect in FIG. 20. Hole 98 is the end portion of a larger hole 100 of an elongated cross-section (FIG. 21), the width of which corresponds to the diameter of cutter 96 and the height of which is somewhat larger than this diameter, so that cutter 96 can tilt within the paper plane, but not in a plane perpendicular to the paper plane. Further seen is a small radial bore 102 into which enters, with clearance and to some depth, the tip of a screw 104. It will be appreciated that screw 104 has no tightening or clamping purpose, but merely serves to prevent cutter 96 from slipping out.

Returning to FIGS. 18 and 19, there is seen another lever in the form of a flat steel spring 106, the upper end of which is riveted to lugs 108 raised from the wings of the U-shaped housing 90 and the lower end of which is provided with a hole 110 (FIG. 20) through which cutter 96 passes. Another hole 112 is provided at about half the spring's length. Through this hole passes the threaded shaft 113 of a thumbscrew 114, which shaft matches a threaded bore in beam 92. Assuming the shaft thread to be right-handed, by turning thumbscrew 114 in the clockwise sense, beam 92 will obviously swivel about its pivot, rod 94, in the clockwise sense, as well.

One task of spring 106 is to constantly apply pressure to beam 92, to ensure that shaft 113 stays in permanent contact with the inside of housing 90. The other, more important task is fundamental to the kinematics of the device: spring 106 constitutes one bar, $\underline{a}$, of a special case of a four-bar linkage a-b-c-d delineated in FIG. 18 by bold dash-dotted lines. Since a=c and b=d, the linkage forms a parallelogram, and if the stationary bar b, extending from the point of bend p of spring 106 to the center of pivot 94 is horizontal, bar d, passing through the centerline of cutter 96, will also be horizontal, regardless of the angle of swivel of beam 92. This is clearly seen when comparing FIG. 18, which shows the device as set for the smallest thread diameter of its range, with FIGS. 22 and 23 representing the device at the middle and the upper ends of its range. In all positions, cutter 96 is seen to be horizontal.

The articulation of the upper end of flat spring 106, constituting bar $\underline{a}$ of the four-bar linkage, is to be understood as being realized by the bend in the spring immediately below lugs 108 in FIG. 18.

The profile of housing 90 can be seen in FIG. 19, with the curved portion abutting and pressing against the thread section opposite the spot being repaired. Along the active portion of the device (roughly the lower third), the wings of the U-shaped profile have been shortened, as clearly seen in FIG. 23, to allow the device to reach a reasonable depth.

While the expansiveness of the device of FIG. 18 (i.e., the difference between the smallest and the largest internal thread diameters treatable) is a given magnitude, the upper limit, as exemplified by FIG. 23, can be increased by means of an attachment mountable on the rounded back of housing 90, as seen in FIGS. 25 to 28. The accessory consists of a trough-like profile 116 of a relatively short length, soldered or brazed to a spacer 118 and fixedly mounted on the back of housing 90 by means of a screw 120. Advantageously, the position of the attachment is also secured by two dowel pins (not shown).

Another embodiment of the device is seen in FIGS. 29 to 32. This embodiment realizes a true four-bar linkage and comprises an attachment enabling the above-mentioned upper limit to be greatly expanded. The fixed or stationery bar is defined by two pivots 122 and 124 extending between the two wings of a housing 126 having a U-shaped profile. Their counterparts are two pivots 128, 130 whereby a block 132 is articulated to a lever 134 constituting one of the long bars of the four-bar linkage. The upper end of lever 134 is articulated to housing 126 by means of pivot 124. The second long bar of the four-bar linkage is constituted by two relatively slender levers 136 articulated to housing 126 by pivot 122 and to block 132 by pivot 128. Cutter 138 smoothly fits a bore 140 in block 132 and is secured inside bore 140 by pivot 128 passing through a bore inside cutter 138 with enough clearance to permit the cutter to adapt itself to the lead angle of the thread to be repaired. Housing 126 is provided with a head piece 142 to which is attachable a handle 144.

In FIG. 29 the device is shown set to the smallest thread diameter for which the tool can be used. For larger diameters, the four-bar linkage is swung out to the required degree, as seen in the left half of FIG. 32. This is accomplished by means of a threaded bolt 146 (see also FIG. 30), the flattened end 148 of which is articulated to lever 134 by means of a pivot 150. The other end of bolt 146 passes through a cross-member 152 articulated to housing 126 and engages a knurled nut 154 articulated to cross-member 152 with only one degree of freedom in rotation. When nut 154 is rotated in the clockwise sense, bolt 146, having a right-handed thread and unable to rotate because of pivot 150, is drawn into nut 154, thereby causing the four-bar linkage to swing to the left, as seen in FIG. 32.

FIG. 32 represents the device of FIG. 29, together with an attachment used to extend its reach. The attachment consists of an arm 156 mountable on handle 144 at discrete intervals determined by holes 158 associated with pegs or bolts (not shown). Further seen is a trough-like profile 160 fixedly attached to arm 156, which abuts against the threads opposite the spot to be repaired and serves as a pressure pad.

An improved pressure pad is seen in FIGS. 33 and 34. It has the form of an elongated, elastically deformable, very shallow trough 162, advantageously made of a piece of hardened and tempered steel sheet riveted to the U-shaped profile of housing 126 in FIG. 30, or housing 90 in FIG. 19. By flexing, trough 162 more or less adapts itself to the curvature of the inside threads, thereby spreading the working pressure over a greater length of thread crests, and thus protecting them against deformation.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A chasing tool for repairing damaged internal threads, comprising:
   a housing of a substantially U-shaped cross-section accommodating a four-bar linkage delineating an elongated parallelogram formed of first and second oppositely located relatively short bars and first and second oppositely located relatively long bars, the first, upper, short bar being the stationary bar of said linkage and being constituted by a section of said housing, the second, lower, short bar being constituted by the center line of a cutter disposed in a mount, said relatively long first and second bars being constituted by lever-like members articulated to said short bar;

handle means for operating such tool, attached to said housing, and screw means, the rotation of which causes said long bars to swivel relative to said stationary bar, whereby said cutter is moved relative to said housing, with the center line of said cutter maintaining its parallel position relative to said stationary linkage bar.

2. The tool as claimed in claim 1, wherein said first lever-like member is a flat-spring one end of which is fixedly clamped to the upper end of said housing, the other end of which is provided with a first opening through which projects said cutter and which constitutes the point of articulation of said first lever-like member, and a second opening through which said screw means passes.

3. The tool as claimed in claim 1, wherein the non-cutting end of said cutter is stepped down to a smaller diameter.

4. The tool as claimed in claim 1, wherein said second lever-like member is a beam one end of which is pivoted to said housing, the other end of which is provided with an elongated bore ending in a short circular bore fitting said stepped-down end of said cutter with clearance, which short bore constitutes the point of articulation of said second lever-like member.

5. The tool as claimed in claim 1, wherein said second short bar of said four-bar linkage is in the form of a block to which said first and second long bars are articulated.

6. The tool as claimed in claim 1, further comprising an attachment for increasing the largest thread diameter for which said tool is usable, comprising a trough-like profile fixedly attached to a spacer member and mountable on the back of said housing.

7. The tool as claimed in claim 1, further comprising an attachment for increasing the largest thread diameter for which said tool is usable, comprising an arm mountable on said handle at a distance from said tool and a trough-like profile fixedly attached to said arm, said profile abutting against the threads opposite to the spot to be repaired.

8. The tool as claimed in claim 1, further comprising a pressure pad attachable to said housing, said pad being in the form of an elongated, shallow trough made of an elastically deformable material.

\* \* \* \* \*